(No Model.) 2 Sheets—Sheet 2.
W. P. GRANVILLE.
ELECTRIC LOG.
No. 439,840. Patented Nov. 4, 1890.
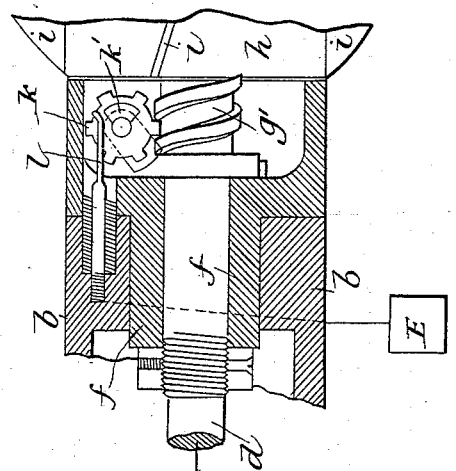
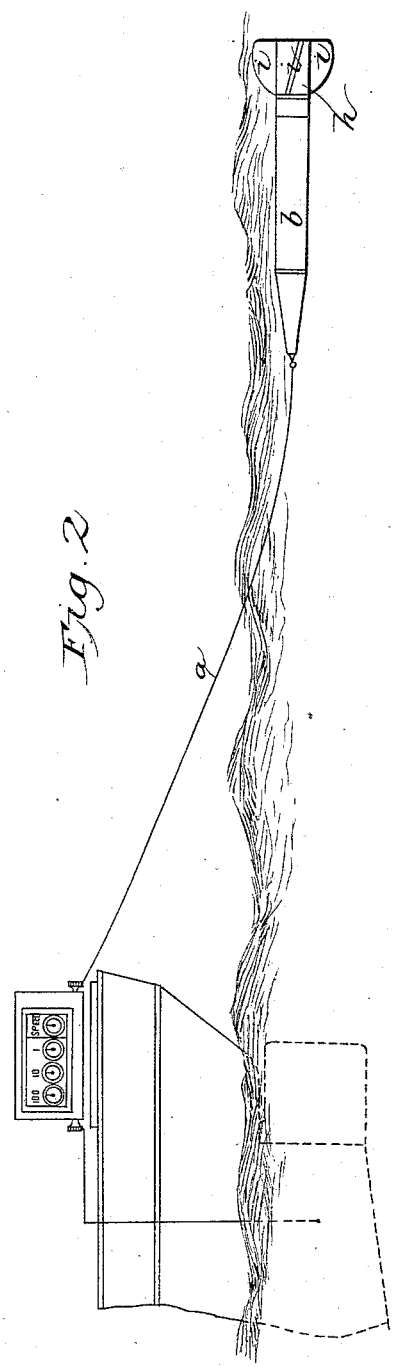
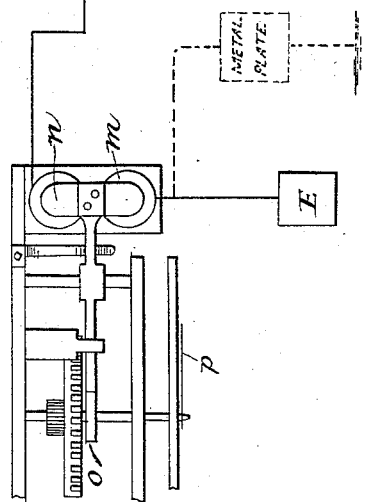
Witnesses
P. Miller
C. M. Brooke
Inventor
W. P. Granville
By his Attorneys
Baldwin Davidson & Wright

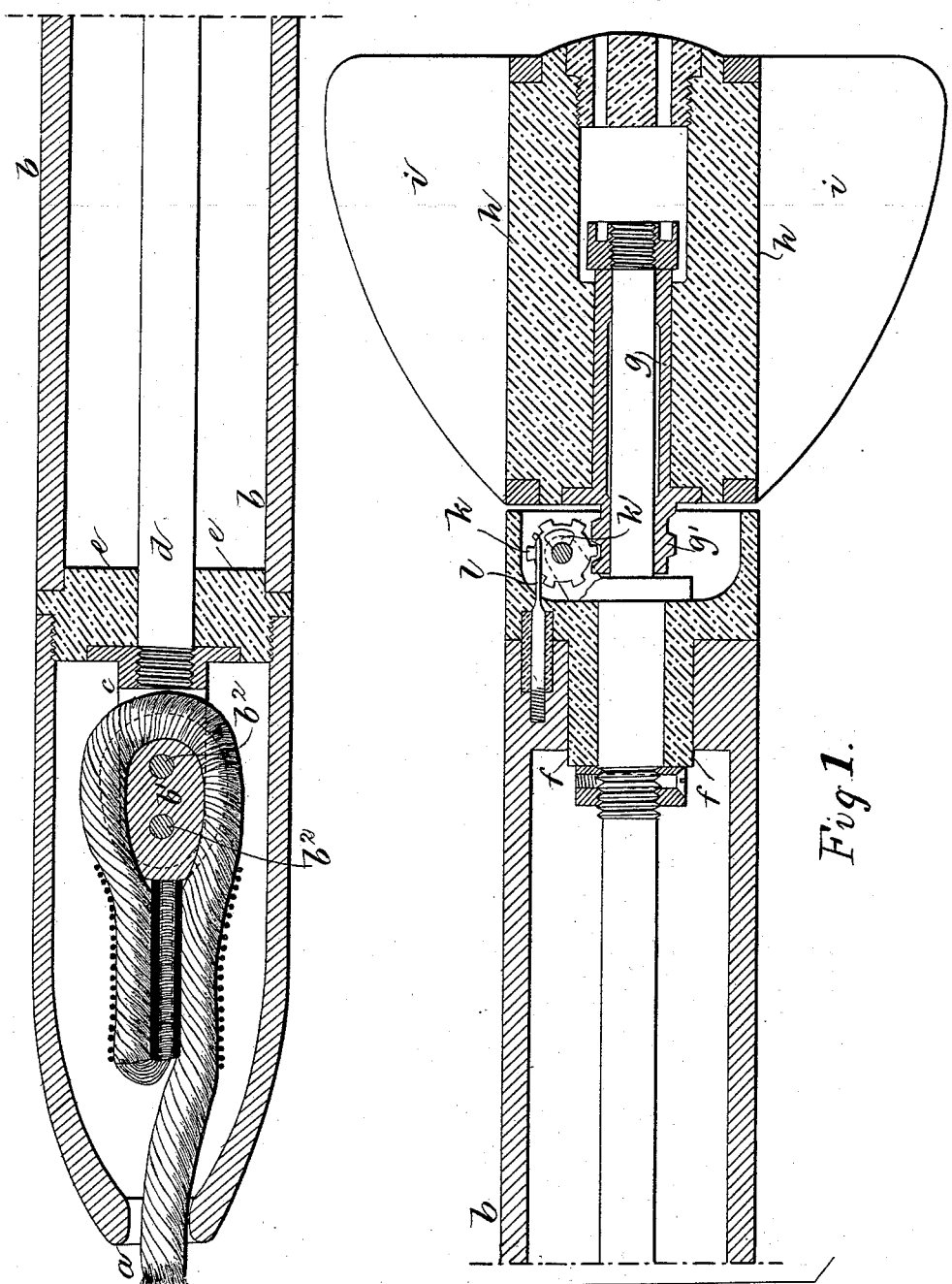

UNITED STATES PATENT OFFICE.

WILLIAM PUDDICOMBE GRANVILLE, OF STROUD GREEN, COUNTY OF MIDDLESEX, ENGLAND.

ELECTRIC LOG.

SPECIFICATION forming part of Letters Patent No. 439,840, dated November 4, 1890.

Application filed June 17, 1890. Serial No. 355,726. (No model.) Patented in England August 24, 1888, No. 12,242.

*To all whom it may concern:*

Be it known that I, WILLIAM PUDDICOMBE GRANVILLE, electrician, a subject of the Queen of Great Britain, residing at 36 Oakfield Road, Stroud Green, in the county of Middlesex, England, have invented certain new and useful Improvements in Electric Logs or Apparatus for Measuring the Speed of Ships, (for which I have received Letters Patent in Great Britain, No. 12,242, dated August 24, 1888,) of which the following is a specification.

According to my present invention I operate recording or indicating mechanism by means of an electric current generated by a galvanic battery, one element of the galvanic couple being at the ship and the other element at the log-chip. Both elements are immersed in the sea (salt water) and are connected by a metallic conductor through circuit making and breaking devices on the log-chip. Preferably, the body of the log is made of metal to constitute one element of the galvanic couple, while the metal of the ship's hull, which is of a different metal, is used as the other element.

The log-chip carries a fan or fly, which rotates as it is dragged through the water, and at intervals the fan makes electrical connection between the body of the log-chip and a conducting wire or strand of small electrical resistance which serves as the log-line. On board the vessel the log-line is connected through an electric counter with the hull of the ship. The resistance in the coils of the electric counter should be small, preferably about two or three ohms. The conductor, which serves as a tow-line, need not be insulated and the contacts, which are brought together by the rotation of the fly, are in the water. This mechanism is so simple that it is unlikely to be deranged and the loss of current from the use of uninsulated conductors and contact parts immersed in the water is not such as to interfere with the efficient working of the instrument.

A further advantage which my log presents over some other electric logs is that no battery on board ship is required. It it obviously not essential that the hull of the vessel itself should form one of the elements of the galvanic couple, as separate plates fixed upon the ship or towed by it may be employed; but it is much more convenient to employ the hull.

In order that my said invention may be fully understood and readily carried into effect, I will proceed to describe the drawings hereunto annexed.

Figure 1 of the drawings shows the log-chip constructed in accordance with my invention. The figure is divided into two parts to allow of its being represented upon a sheet of convenient size. Fig. 2 is a diagram showing the connection between the log-chip and the register on a vessel; and Fig. 3 is a diagram showing, on a larger scale, the register, the circuit making and breaking devices of the log-chip, and the electric circuit.

$a$ is the tow-line. It may consist of a bare wire or small strand of copper, bronze, iron, or any other suitable metal having, when submerged in salt water, approximately the same electro-chemical action as the hull of the ship. Although not necessary, I prefer for mechanical convenience and safely to combine the wires with hemp, flax, or jute, and so as to prevent corrosion to cover the wires with a thin coating of gutta-percha, india-rubber, or any durable elastic varnish.

The log-line may be constructed as follows: Around a cod-line is laid spirally five copper wires thinly covered with gutta-percha, also five yarns of hemp, &c., a yarn being laid between each wire, so as to fill up the interstices. The whole is then braided with hemp or flax, &c., the outside diameter of the completed log-line being about three-eighths of an inch. At each end the five wires are connected together so that they form one multiple conductor of about one ohm resistance or less. I prefer to employ gun-metal for all the metallic parts of the log-chip, with the exception of the body $b$, which is of zinc.

The tow-line $a$ is well connected both mechanically and electrically with the eye $b'$. In connection with the eye there is a pin $b'$, and I wind the wires of the tow-line around the pin and secure them by soldering. I envelope the joint in gutta-percha to prevent corrosion.

When the log-chip is prepared for use, the eye $b'$ is secured by two bolts $b^2\ b^2$ to the fork c, which is screwed onto the end of the spindle d. The log-line is connected with bare metal immersed in the water, and thus is uninsulated, whether the wires of the line itself be covered with insulating material or otherwise. Upon the spindle are two vulcanite disks e and f, and between these the zinc body b is held, so that it is insulated by the vulcanite from the spindle. Upon the spindle at its rear end the fly is mounted. It consists of a metal sleeve g, upon which is a worm g'. A nut upon the end of the spindle keeps the sleeve in place. h is a cylindrical block of vulcanite fixed upon the sleeve. It is closed in rear by a screw-plug of the same material. The block h carries four or other number of metal blades i, which are inclined or of screw-like form that they cause rotation of the fly as the log-chip is drawn through the water. The spindle is prevented from revolving by its attachment to the log-line, which resists torsion. The worm g' engages with the teeth of a small wheel k, which is mounted on a pin or axis held in a forked arm projecting from the spindle. This wheel has a cam-like projection k' upon it on one side.

l is a spring-finger, which is screwed into the zinc body. It passes through a small vulcanite bush, which is firmly fixed in a cavity prepared for it in the body. This bush is intended to prevent local action where the two metals come into contact. Once in each revolution of the wheel k the cam-piece k' rubs strongly upon the spring l, and then there is metallic connection between the zinc body of the log-chip and the hull of the chip through the indicator on board the vessel and an electric current passes; or the second connection of the indicator-coils might be to some other mass of metal immersed in the sea, as indicated by dotted lines in Fig. 3.

The indicator on board the ship may consist simply of an electro-magnet m and armature n, a train of counting-wheels, and an escapement-lever o or pawl, which propels the wheels or permits them to turn one step each time the magnet attracts the armature.

There are pointers p on the axes of the wheels, which indicate upon dials the distance run. The armature is held off from the magnet by a spring or weight, which yields to the attraction of the magnet. This spring or weight may be adjustable. Indicators such as described or of this class are well known, and any such, if well made and properly graduated in accordance with the object in view, is suitable, provided its coils are of low resistance.

The conducting tow-line a is placed in good metallic connection with the coils of the indicator, and these coils at their other end are connected with the hull, so as to establish good metallic connection therewith; or, as before stated, metallic connection may be made with some other mass of metal immersed in the sea; but this is not convenient.

This log may also be used as a current-meter. The instrument is then suspended or supported in the water in the position required. The log-line passes to an indicator on shore and a plate of iron or copper immersed in the water serves in place of the ship's hull as one of the galvanic elements.

What I claim is—

1. The combination of a metallic body, such as a plate of copper, a log-chip, an electrical conductor connecting them, a metallic body, such as zinc, carried by the log-chip and forming with the copper plate the two elements of a galvanic couple and both of which are immersed in the sea, circuit making and breaking devices carried by the log, and an indicator included in the electrical circuit.

2. The combination of an electrical conductor electrically connected to a metallic body on a ship, such as the metallic covering of the hull, a log-chip carrying a metallic body, forming with the metallic body of the ship the two elements of a galvanic couple, circuit making and breaking devices carried by the log, and a counting-train included in the electric circuit and operating indicating devices on the ship.

3. In an electric log, a circuit comprising a conducting tow-line, a metallic log-body, an electric counter, the ship's hull, and the sea completing the circuit, also a fly or like instrument, which, rotating as it is drawn through the water, opens and closes the circuit at intervals.

4. An electric log comprising an uninsulated conducting tow-line, a log-body with a fly or like instrument, which, rotating as it is drawn through the water, opens and closes a metallic connection between the tow-line and the log-body, the ship's hull or other metallic surface immersed in the sea and forming with the log-body a galvanic couple, and an electric counter within the ship, connected with the said surface and with the tow-line.

5. In an electric log, a circuit including a galvanic couple, a conducting tow-line, a fly or like instrument in metallic connection with the tow-line and which rotates as it is drawn through the water, a contact part in connection with the fly, a log-body and another contact part thereon, both contact parts being immersed in the water, and an electric counter in the ship and connected with the tow-line.

6. In an electric log, the combination of the conducting tow-line, the fly and worm in electrical connection therewith, the worm-wheel and cam-piece, and the zinc body with the finger projecting therefrom, upon which the cam-piece rubs from time to time as the fly revolves.

WILLIAM PUDDICOMBE GRANVILLE.

Witnesses:
JNO. H. WHITEHEAD,
24 Southampton Buildings, London, W. C.
THOMAS LAKE,
17 Gracechurch Street, London.